(No Model.)
W. EVANS.
CLIP FOR VEHICLE SPRINGS.
No. 324,990. Patented Aug. 25, 1885.
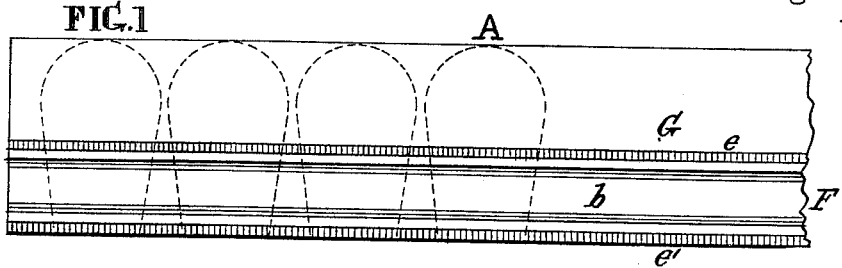
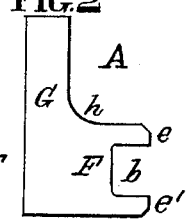
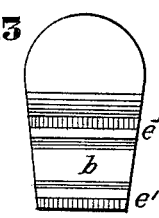
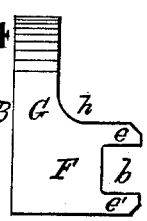
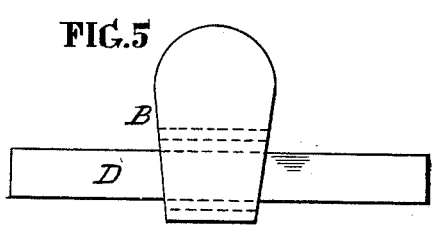
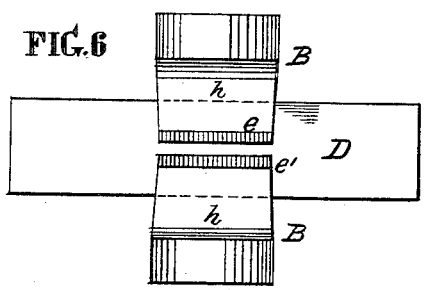
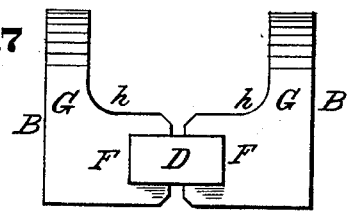
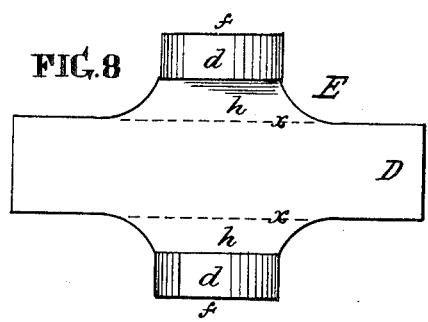
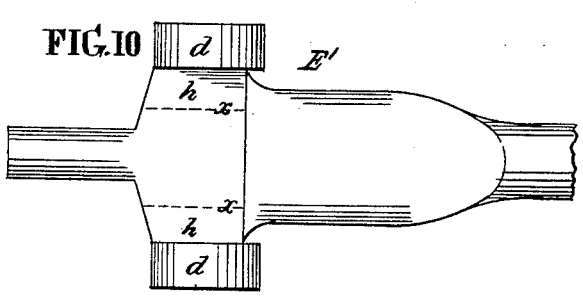
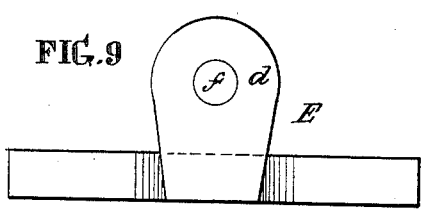
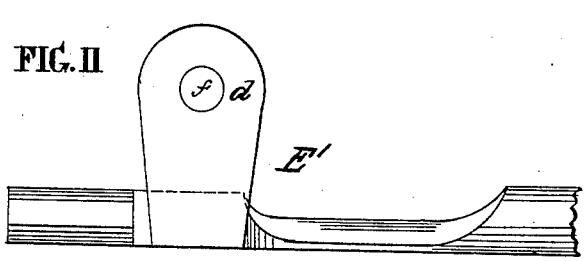
Witnesses.
J. E. W. Bewley.
Clarence P. Leoy.
Inventor
William Evans.
per Thomas J. Bewley, att.

UNITED STATES PATENT OFFICE.

WILLIAM EVANS, OF PHILADELPHIA, PENNSYLVANIA.

CLIP FOR VEHICLE-SPRINGS.

SPECIFICATION forming part of Letters Patent No. 324,990, dated August 25, 1885.

Application filed August 7, 1884. (No model.)

*To all whom it may concern:*

Be it known that I, WILLIAM EVANS, a citizen of the United States, residing at Philadelphia, in the county of Philadelphia and State of Pennsylvania, have invented a new and useful Improvement in Clips for Forming Shackles for Springs and Shafts of Vehicles, of which the following is a specification.

In the method heretofore used for forming shackles two strips of steel or iron of suitable width and thickness were heated to the welding point, laid together in the form of a Saint Andrew's cross, and swaged down by the hammer until a weld of the pieces had been made. The cheek-pieces were then bent at right angles to the main part, holes punched therein for the bolt, and the shackle dressed in any convenient manner.

The object of my invention is to form clips for shackles in a cheap and expeditious manner.

The invention relates to clips for forming shackles of springs and shafts of vehicles, constructed with the grooved and flanged portion thereof of thicker metal than that of which the cheeks are composed, whereby a set-off or wide space may be obtained between the inner faces of said cheeks by using a narrow strip of metal upon which two of said clips are welded for forming the shackle.

It also consists in providing said clip with either one or two flanges to the groove formed in the thick portion of the clip for the reception of the edges of the bar of steel to which the clips are welded in forming the shackle, as hereinafter fully described.

In the accompanying drawings, which make a part of this specification, Figure 1 is a face view of a rolled bar, A, from which the clips B are cut. Fig. 2 is an end view of the same. Figs. 3 and 4 are an inner face and an end view of the clip B. Figs. 5 and 6 are respectively a side elevation and a plan view of two clips in position on the narrow strip of steel D. Fig. 7 is an end view of the same. Figs. 8 and 9 are a plan and side view of the finished spring-shackle E. Figs. 10 and 11 are like views of a shaft-shackle, E'.

Like letters of reference in all the figures indicate the same parts.

In the preliminary process a heated billet of steel or iron is passed between a pair or series of rolls until it has assumed the shape of the bar A, Figs. 1 and 2. The bar is cut into clips B by a proper shaped pair of dies in a punching press. The dotted lines in Fig. 1 show the form of clip to be cut. The bar A is rolled with the portion F of thicker metal than the cheek part G. The object of this formation is that a wide space may be obtained between the cheeks $d\ d$ of the finished shackle by using a narrow strip of steel, D, upon which to weld the clips, thus giving economy of material and retaining the necessary space between the inner faces of the cheek-pieces $d$ (seen clearly in Figs. 8 and 9) for the reception of the width of the end of a spring.

The thick portion F of the clip has on its face the groove $b$ and the flanges $e\ e'$ above and below it, between which the edge of the strip of steel D fits closely, and is held therein during the heating of the pieces.

In making the shackle shown in Figs. 8 and 9 I take two clips, B, and place one upon each side of a narrow strip of steel or iron, the side of the strip entering the groove $b$, as shown in Figs. 5, 6, and 7, bring to a welding heat, and swage the pieces down by proper dies, the flanges $e\ e'$ uniting with the strip D and forming a perfect weld of all the parts with but one heat being required to finish the shackle.

The metal of the clip between the inner part of the groove $b$ and the cheeks $d$ is technically known as the "set-off" $h$, (shown between the dotted line $x$ and said cheeks $d$ in Figs. 8 and 10,) the unit of the strip D and thick portion F of the clip, when welded and hammered down, forming sufficient space between the inner faces of the cheeks to receive the width of the end of a spring when inserted therein.

The bar A may be rolled with but the one flange $e$, if desired, the outer one, $e'$, being dispensed with in rolling, in which case it may be "dragged up" by the cutting-die when the clips are cut from the bar.

A finished shackle, E, is shown in Figs. 8 and 9 for a carriage-spring, having holes $f$ punched in the cheeks $d$ for the reception of the confining-bolt. Figs. 10 and 11 represent a shaft-shackle, E', constructed of the same clip B as the spring-shackle, the only change being in the shape of the body, which is swaged by a different die. In the drawings the cheeks $d$ are shown uppermost for the better illustration. In use, however, the body of the shackle is above, with the end of the spring suspended between the cheeks.

I claim as my invention—

1. The clip B, cut from the rolled bar A by suitable dies, having the portion F, rolled of thicker metal than the cheek-piece G, for forming the set-off $h$, substantially as described.

2. The shackle E, constituted of two of the clips B, and the bar D, arranged in relation to each other and welded, substantially as described.

WILLIAM EVANS.

Witnesses:
 THOMAS J. BEWLEY,
 JOHN H. EVANS.